April 2, 1940.    L. T. BROWN    2,196,097
LENS OPENING CONTROL FOR CAMERAS
Filed Nov. 17, 1938

INVENTOR
Larry T. Brown
BY Warren G. Ogden
ATTORNEY

Patented Apr. 2, 1940

2,196,097

UNITED STATES PATENT OFFICE 2,196,097

LENS OPENING CONTROL FOR CAMERAS

Larry T. Brown, Angels Camp, Calif., assignor to Keystone Mfg. Co., Boston, Mass., a corporation of Massachusetts Application November 17, 1938, Serial No. 240,936

2 Claims. (Cl. 95—64)

This invention relates to improvements in means for controlling the lens opening permitted by the adjustable diaphragm built into the lens system of cameras and is particularly useful for motion picture cameras.

Ordinarily the diaphragm control ring of a lens system is provided with an f scale which is rotated past a fixed index in order to select the desired lens opening, or a handle fixed to the rotary ring has a pointer movable over a suitably located f scale. In either case the diaphragm is held at the chosen lens opening by a light friction which, if disturbed, loses the setting and spoils the ensuing picture. Also when a desired opening is once determined the diaphragm cannot accurately be set to a different opening without lowering the camera from the scene which is being photographed.

One object of this invention is to enable a shooter of motion pictures to change the size of the lens opening within predetermined limits while a scene is being shot, or without taking his eye from the view-finder. The feature of the invention for accomplishing this object further provides for the simple control for fading a scene in or out, or both, as the operator may desire.

A further object is to enable a photographer to set the diaphragm of his camera to a chosen opening in a manner that will positively retain that setting until he requires a different setting.

The nature of the invention and its features for achieving the above objects and such others as may hereinafter appear, as will be recognized by those skilled in the art, will best be understood from the following detailed description of the preferred simplified form of the invention and other forms evolved from a knowledge of said preferred form as illustrated in the accompanying drawing, the scope of the invention being indicated in the appended claims.

Figure 1:
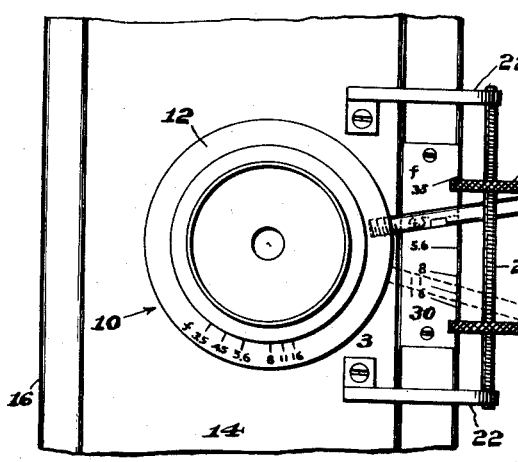
Figure 1 is a view, in front elevation, of the diaphragm control of this invention associated with the lens system of a motion picture camera. In this view the assembly is such that control of the lens opening is had by the left hand of the operator.
Figure 2:
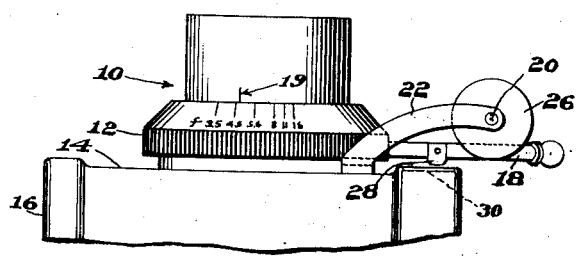
Figs. 2 and 3 are views, in end and in side elevation, of the invention as illustrated by Fig. 1.
Figure 3:
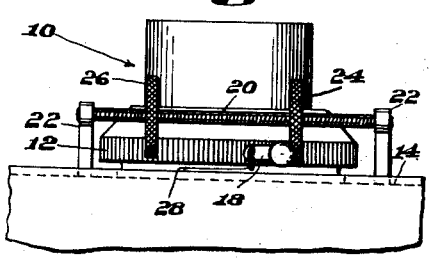

In the embodiment of the invention illustrated in Figs. 1, 2 and 3 of the drawing, 10 indicates generally a lens system suitable for the type of camera used which includes a rotary ring 12 mechanically connected to the diaphragm so that its movement, in one direction or the other, causes the diaphragm to be either opened or closed to suit the light conditions all in a manner well known to those skilled in the art. The lens system assembly projects from the front face 14 of the camera and its diaphragm ring 12 ordinarily stands (see Figs. 2 and 3) slightly above said front face for free rotary movement. In shooting motion pictures it is the more common practice for the operator to hold the lower part of the camera in the right hand using a finger of that hand for the exposure button located on the right side face 16 of the camera and to steady the camera with the left hand. Because the right hand of such operators is not free for any other service than feeding the film it is necessary to locate the diaphragm control of this invention in a position where it can be manipulated by the left hand of the operator. Such left hand control of an adjustment of the diaphragm ring to different settings is illustrated by Figs. 1 to 3.

In a simple form the invention may provide a radially extending diaphragm adjustment bar or handle 18 which may be screwed into or otherwise secured to the diaphragm adjusting ring 12. The handle 18 projects outward beneath a guide rod such as a screw 20 preferably, but not necessarily, at the left of the lens system 10, with the screw standing substantially vertical (see Fig. 1) while the camera is in use. The two ends of the guide rod are set in a bracket or brackets 22 secured to any convenient part of the camera casing and its carries two movable stops, for example the threaded nuts or disks 24 and 25. The threading of the disks is such that they may quickly be run up and down a threaded guide rod but in any position of rest they are sufficiently tight to enable them to retain said position on the rod against accidental displacement. It is within the scope of the invention to use any equivalent kind of movable stop that may be held in a selected position on the guide rod.

As an example of the use of the diaphragm opening control as above described, suppose the operator desires to take a panoramic shot where shaded areas will alternate with bright areas one or more times across the width, i. e., length of the film on which it is to be recorded. The scene might be guests moving across sunlit lawn and beneath shade trees at an outdoor reception, a pastoral scene on a farm, a moving object passing through both light and shadow as an automobile or train, or possibly a squirrel running across open spaces and then leaping into trees.

In using the present invention for panoramic or the like shots under conditions of light and shade, and using an assembly such as illustrated in Figs. 1 to 3, the operator prepares for the light conditions by first swinging the handle 18 toward the top of the camera until the fixed index 19 (Fig. 2) shows the correct lens opening on its scale for the indicated shade, say f 4.5, and, while holding the handle in this position, screws the upper disk 24 down on its guide rod 20 to a position where it will just engage the handle 18 and serve as an accurate stop for determining this diaphragm setting. This operation is followed by a downward movement of the handle 18 to a lens opening for the indicated sunlight, say f 11, and the lower disk 26 is brought up on the rod 20 to a stop position. While the scene is being shot the handle 18 may instantly be moved from one stop to the other as a larger or smaller lens opening is required by the changing light conditions for obtaining a distinct negative.

While the f scale (Figs. 1 and 2) as marked on the diaphragm control ring by the manufacturer of the lens system may be used for obtaining the predetermined spread of the two adjustable stops, photographers may find it more convenient if the handle 18 is provided with a pointer 28 which, when the handle is moved, traces across an enlarged f scale 30 which would be located below the guide rod 20.

Figure 4:
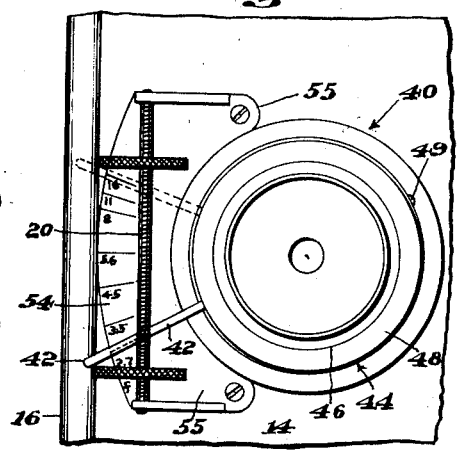
Fig. 4 is a view, in front elevation, of the diaphragm control of this invention associated with another type of lens system for motion picture cameras. In this view the assembly is such that control of the lens opening is had by the right hand of the operator.
Figure 5:
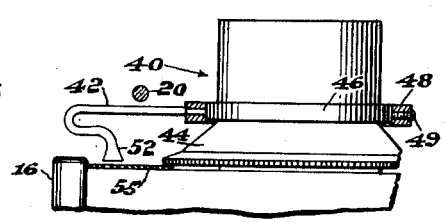
Fig. 5 is a view, in elevation and part section, of a portion of the assembly as illustrated in Fig. 4.

Some operators prefer to operate the exposure button with a finger of the left hand. For such operators the lens opening control of this invention should be located at the right side of the lens system so that its operating handle may extend to the right. Figs. 4 and 5 show such a construction, somewhat modified from Figs. 1 to 3 because applied to a differently constructed lens assembly which is indicated generally by 40. It will be observed that the lens of Figs. 1 to 6 is an f 3.5 while the lens of Fig. 4 is an f 2.7, and that the length of the guide rod 20 is long enough for such variations.

For operation of the diaphragm adjusting handle 42 by the right hand of the operator the originally beveled diaphragm ring 44 of the lens system 40 may be re-shaped, as shown by Fig. 5, to form an upper collar 46 on which an annulus 48, from which the handle 42 projects radially, may be secured by a set screw 49 or other suitable mode of securement. The handle 42 projects outward between two adjustable stops on a guide rod carried by a bracket secured to the front face of the camera, which assembly may all be substantially as illustrated in Figs. 1 to 3. Conveniently the handle 42 may be in the form of ribbon material, metallic or otherwise, (Fig. 5). The inner end of the handle is set into the annulus 48, its outer end being bent and shaped to provide a pointer 52 for cooperating with an f scale 54 conveniently indexed on the plate bracket 55 (Fig. 4).

Right hand control of the form of the invention shown in Figs. 1, 2 and 3 may be had by mounting the brackets 22 at the other side of the lens system and attaching the handle 18 at a point diametrically opposite its illustrated location.

Figure 6:
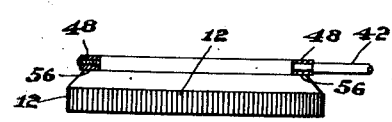
Fig. 6 is a view similar to Fig. 5 illustrating how the kind of control handle mounting shown in Fig. 5 may be attached to the diaphragm ring of the lens system shown in Figs. 1 to 3.

Fig. 6 illustrates how a control handle of the type shown in Fig. 5 may be mounted on the diaphragm ring 12 of the lens system shown in Figs. 1, 2 and 3. This would necessitate merely cutting a circular rabbet 56 in the ring thus providing a seat on which the annulus 48 may be set and secured with its handle 42 extending to either the right or left of the lens system as may be desired.

The spread stop feature for predetermining the lens opening for two differing light intensities may be employed to fade-in a scene from darkness or semi-darkness to clear vision, or vice versa at the end of a scene, or both, at the will of the operator. Those skilled in the art will understand that by setting one adjustable stop at a position on the guide rod for semi or no vision through the diaphragm and the other stop at a position for a lens opening which is correct for the light conditions, fading-in may be accomplished without danger of overrunning the opening suitable for the scene to be shot. Fading-out is an equally simple operation; merely moving the handle in the opposite direction. In either case it is merely necessary to move the handle between the spread stops for one predetermined lens opening to the other. The diaphragm adjusting mechanism of the lens system itself has a stop which determines the fade limit of the diaphragm. When starting or ending a fade at this limit the equivalent guide rod stop may be moved to an inoperative position on the guide rod, making it necessary for a fade-in or fade-out to adjust only the other guide rod stop which is so set that, when engaged by the moving handle, a diaphragm opening will be established suitable to the light conditions, or said opening will be re-established on fading-in another scene.

In the drawing the diaphragm opening control mechanism has been shown associated with the lens system only at the right or the left side of the camera but those skilled in the art will recognize that while these are convenient locations for manipulation by the right or the left hand of the operator, within the scope of this invention the particular position of the control relative to the lens system is unimportant so long as it may successfully be operated while shooting a scene.

Photographers will recognize that the invention is useful also when associated with the lens system of a still picture camera in that any selected lens opening may be maintained against change by bringing the two adjustable stops up against both sides of the diaphragm control handle at its chosen position thus locking it against movement from that position until a change is desired by the photographer.

It is to be understood that the phraseology or terminology employed herein is for the purpose of description and not of limitation and it is not intended to limit the invention beyond the terms of the several claims hereto appended as considered in view of the prior art and the requirements thereof.

What is claimed as new, is:

1. In a motion picture camera having a lens system assembly including an adjustable diaphragm, a ring rotatable to adjust the diaphragm, an operating handle extending outward from said ring, a threaded rod adjacent and in operative relation to said lens assembly and in a plane parallel to the plane of movement of said handle, said handle projecting beyond said rod, bracket means supported on the camera securely holding said rod in place, a pair of independently adjustable threaded stop nuts on said threaded rod adapted to travel on said rod one on each side of said handle, whereby said nuts may be set to spaced positions for stopping an adjusting movement of said handle in either direction beyond its position for establishing a preselected small lens opening at one end of its movement and a preselected large lens opening at the other end of its movement.

2. In a camera having a lens system assembly including a rotatable diaphragm ring, a handle secured to said ring to adjustably move the same, bracket means supported by said camera, said bracket means supporting a guide rod adjacent and in operative relation to said lens assembly and in a plane parallel to the plane of movement of said handle, said handle projecting beyond said rod, and two independently adjustable rod-engaging stops on said rod each adapted to be moved to a selected position on said rod one at each side of said handle, one stop being adjustable on said rod to a position engaging one side of said handle when its angular position may indicate one lens opening, and the other stop being adjustable on said rod to a position engaging the other side of said handle when its angular position may indicate the same or a different lens opening.

LARRY T. BROWN.